(12) United States Patent
Turnbull et al.

(10) Patent No.: US 8,585,520 B2
(45) Date of Patent: Nov. 19, 2013

(54) ELECTRICALLY VARIABLE TRANSMISSION

(75) Inventors: Paul F. Turnbull, Canton, MI (US); Brendan M. Conlon, Rochester Hills, MI (US); Alan G. Holmes, Clarkston, MI (US); Shawn H. Swales, Canton, MI (US)

(73) Assignee: General Motors Global Technology Operations LLC, Detroit, MI (US)

( * ) Notice: Subject to any disclaimer, the term of this patent is extended or adjusted under 35 U.S.C. 154(b) by 454 days.

(21) Appl. No.: 12/944,805

(22) Filed: Nov. 12, 2010

(65) Prior Publication Data

US 2012/0122622 A1    May 17, 2012

(51) Int. Cl.
*F16H 3/72* (2006.01)
(52) U.S. Cl.
USPC .............................................................. 475/5

(58) Field of Classification Search
None
See application file for complete search history.

(56) References Cited

U.S. PATENT DOCUMENTS

| | | | |
|---|---|---|---|
| 2,518,825 A | 8/1950 | Simpson | |
| 3,566,717 A | 3/1971 | Berman et al. | |
| 6,837,816 B2 * | 1/2005 | Tsai et al. | 475/5 |
| 2009/0288895 A1 | 11/2009 | Klemen et al. | |

* cited by examiner

*Primary Examiner* — Erin D Bishop
(74) *Attorney, Agent, or Firm* — Quinn Law Group, PLLC

(57) ABSTRACT

A hybrid transmission having an input member, an output member, and a single motor/generator is characterized by a plurality of fixed-ratio modes of operation and at least one electrically variable mode of operation. In the fixed-ratio modes of operation, the speed ratio between the input member and the output member is independent of the speed of the motor/generator. In the electrically variable mode of operation, the speed ratio between the input member and the output member is dependent upon the speed of the motor/generator.

11 Claims, 8 Drawing Sheets

ELECTRICALLY VARIABLE TRANSMISSION

TECHNICAL FIELD

This invention relates to electrically variable transmissions.

BACKGROUND

In the prior art, electrically variable vehicle transmissions (EVTs) employ two electric motor/generators that are coaxially oriented with an input shaft connectable to an engine, an output shaft, and a plurality of planetary gearsets each having respective first, second, and third members. Each motor/generator is operatively connected to a respective member of one of the planetary gearsets to provide a range or mode of transmission operation characterized by a continuously variable speed ratio between the input shaft and the output shaft.

SUMMARY OF THE INVENTION

A transmission includes an input member; an output member; and a stationary member. The transmission also includes first and second planetary gearsets, each having respective first, second, and third members. A single motor/generator has a rotor that is operatively connected to one of the members of the planetary gearsets for rotation therewith. The transmission further includes a plurality of torque transmitting devices, each of which is selectively engageable to operatively interconnect a respective one of the members to another of the members, the input member, the output member, or the stationary member.

The torque transmitting devices are engageable in various combinations to provide a plurality of fixed speed ratio modes in which the value of the speed ratio between the input member and the output member is independent of the speed of the rotor. The torque transmitting devices are also engageable in at least one combination to provide an electrically variable mode of operation in which the speed ratio between the input member and the output member is dependent on the speed of the rotor.

The transmission provided herein is capable of battery-electric operation, electrically variable operation, and hybrid-electric operation, and conventional operation, with only a single electric motor/generator.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
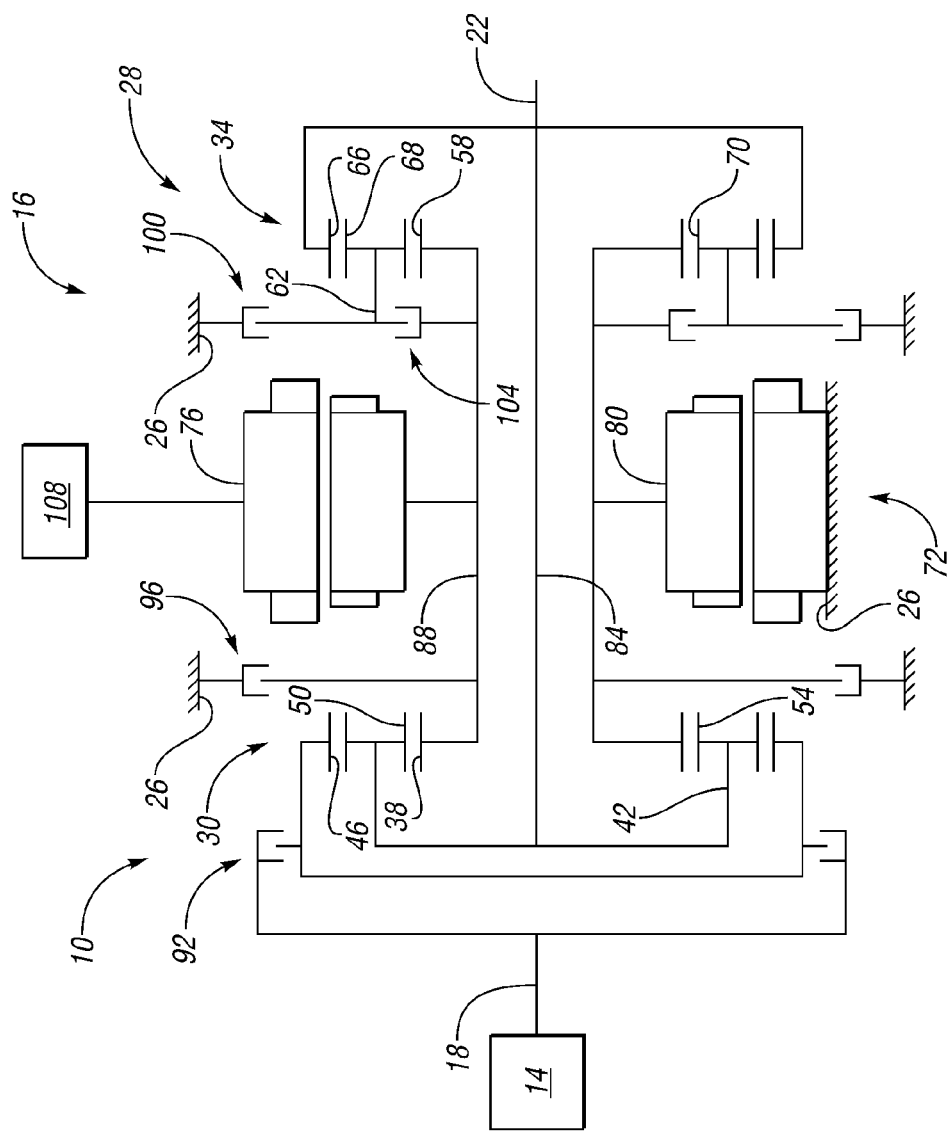
FIG. 1 is a schematic depiction of a powertrain including a first transmission in accordance with the claimed invention.

Referring to FIG. 1, a powertrain 10 includes an engine 14 operatively connected to a transmission 16. The transmission 16 includes an input member 18, an output member 22, and a stationary member, such as the transmission housing 26. The transmission 16 also includes a geartrain 28 having a first planetary gearset 30 and a second planetary gearset 34. The engine 14 is operatively connected to the input member 18 to transmit torque thereto.

The first planetary gearset 30 includes a first member, i.e. sun gear member 38, a second member, i.e., planet carrier 42, and a third member, i.e. ring gear member 46. A plurality of planet gears 50, 54 are rotatably mounted to the planet carrier 42. Each of the planet gears 50, 54 is meshingly engaged with the sun gear member 38 and the ring gear member 46.

The second planetary gearset 34 includes a first member, i.e. sun gear member 58, a second member, i.e., planet carrier 62, and a third member, i.e. ring gear member 66. A plurality of planet gears 68, 70 are rotatably mounted to the planet carrier 62. Each of the planet gears 68, 70 is meshingly engaged with the sun gear member 58 and the ring gear member 66.

The transmission 16 has a single motor/generator 72 having a stator 76 and a rotor 80. The stator 76 is mounted with respect to the housing 26. A shaft 84 interconnects the planet carrier 42 of the first planetary gearset 30, the ring gear member 66 of the second planetary gearset 34, and the output member 22 for unitary rotation, i.e., such that the planet carrier 42, the ring gear member 66, and the output member 22 rotate together as a unit. A member 88 interconnects the sun gear member 38 of the first planetary gearset 30, the sun gear member 58 of the second planetary gearset 34, and the rotor 80 for unitary rotation, i.e., such that the sun gear member 38, sun gear member 58, and the rotor 80 rotate together as a unit.

The transmission 16 further includes a plurality of torque transmitting devices 92, 96, 100, 104, each being selectively engageable to operatively interconnect a respective one of the members of the planetary gearsets 30, 34 to another of the members, the input member 18, the output member 22, or the stationary member 26. More specifically, a first torque transmitting device 92 is a clutch that is selectively engageable to operatively connect the input member 18 to the ring gear member 46 for unitary rotation. A second torque transmitting device 96 is a brake that is selectively engageable to operatively connect member 88, sun gear member 38, sun gear member 58, and rotor 80 to the housing 26. A third torque transmitting device 104 is a clutch that is selectively engageable to operatively connect member 88, sun gear member 38, sun gear member 58, and rotor 80 to the planet carrier 62 for unitary rotation. A fourth torque transmitting device 100 is a brake that is selectively engageable to couple the planet carrier 62 to the housing 26.

The torque transmitting devices 92, 96, 100, 104 are engageable in various combinations to provide a plurality of fixed speed ratio modes in which the value of the speed ratio between the input member 18 and the output member 22 is independent of the speed of the rotor 80. More specifically, a first fixed speed ratio between the input member 18 and the output member 22 is achieved when torque transmitting devices 92 and 100 are engaged and torque transmitting devices 96 and 104 are disengaged. A second fixed speed ratio between the input member 18 and the output member 22 is achieved when torque transmitting devices 92 and 96 are engaged and torque transmitting devices 100, 104 are disengaged. A third fixed speed ratio between the input member 18 and the output member 22 is achieved when torque transmitting devices 92 and 104 are engaged and torque transmitting devices 96 and 100 are disengaged. In the embodiment depicted, each of the sun gear members 38, 58 has twenty-four teeth, each of the planet gears 50, 54, 68, 70 has twelve teeth, and each of the ring gear members 46, 66 has forty-eight teeth, which results in the first fixed speed ratio being 2.5:1, the second fixed speed ratio being 1.5:1, and the third fixed speed ratio being 1:1.

The transmission 16 also includes an energy storage device, which, in the embodiment depicted, is a battery 108. The battery 108 is operatively connected to the motor/generator 72 to transmit electrical energy thereto, and to receive electrical energy therefrom. Accordingly, the powertrain 10 may be operated as a hybrid powertrain during the fixed ratio modes of operation. More specifically, when the commanded power output of the powertrain 10 is less than the power output of the engine 14, the excess power of the engine 14 may be used to drive motor/generator 72, with the electrical energy being transmitted to the battery 108 for storage. Similarly, when the commanded power output of the powertrain 10 is higher than the power output of the engine 14, then electrical energy from the battery 108 is supplied to the motor/generator 72.

The torque transmitting devices 92, 96, 104, 100 are also engageable in at least one combination to provide an electrically variable mode of operation in which the speed ratio between the input member 18 and the output member 22 is dependent on the speed of the rotor 80. More specifically, in the embodiment depicted, the speed ratio between the input member 18 and the output member 22 is dependent upon, or varies with, the rotational velocity of the rotor 80 when torque transmitting device 92 is engaged and torque transmitting devices 96, 104, and 100 are disengaged. Accordingly, in the electrically variable mode of operation, the speed ratio is controllable by controlling the speed of the rotor 80.

The torque transmitting devices are also engageable in at least one combination to provide at least one battery-electric mode of operation. In a battery-electric mode of operation, all of the power transmitted to the output member 22 from the transmission 16 is supplied by the battery 108 via the motor/generator 72. In a battery-electric mode, the engine 14 is not mechanically connected to the output member 22 to transmit power thereto, whereas rotor 80 is mechanically connected to the output member 22 to transmit torque thereto.

The transmission of FIG. 1 is characterized by two battery-electric modes of operation. More specifically, a first battery-electric mode is achieved when torque transmitting device 100 is engaged and torque transmitting devices 92, 96, 104 are disengaged. A second battery-electric mode is achieved when torque transmitting device 104 is engaged and torque transmitting devices 92, 96, 100 are disengaged. The first battery electric mode is characterized by a −2:1 motor to output member speed ratio, and the second battery-electric mode is characterized by a 1:1 motor to output member speed ratio. The first battery-electric mode is the "reverse" mode for the transmission 16.

A neutral mode of operation is achieved with all four of the torque transmitting devices 92, 96, 100, 104 disengaged. A park mode of operation is achieved with torque transmitting devices 96, 104 being engaged and torque transmitting devices 92, 100 being disengaged.

The transmission 16 is characterized by the absence of any additional electric motors (besides motor/generator 72) that are configured to add power to the input member 18, output member 22, stationary member 26, or any member of the planetary gearsets 30, 34.

Figure 2:
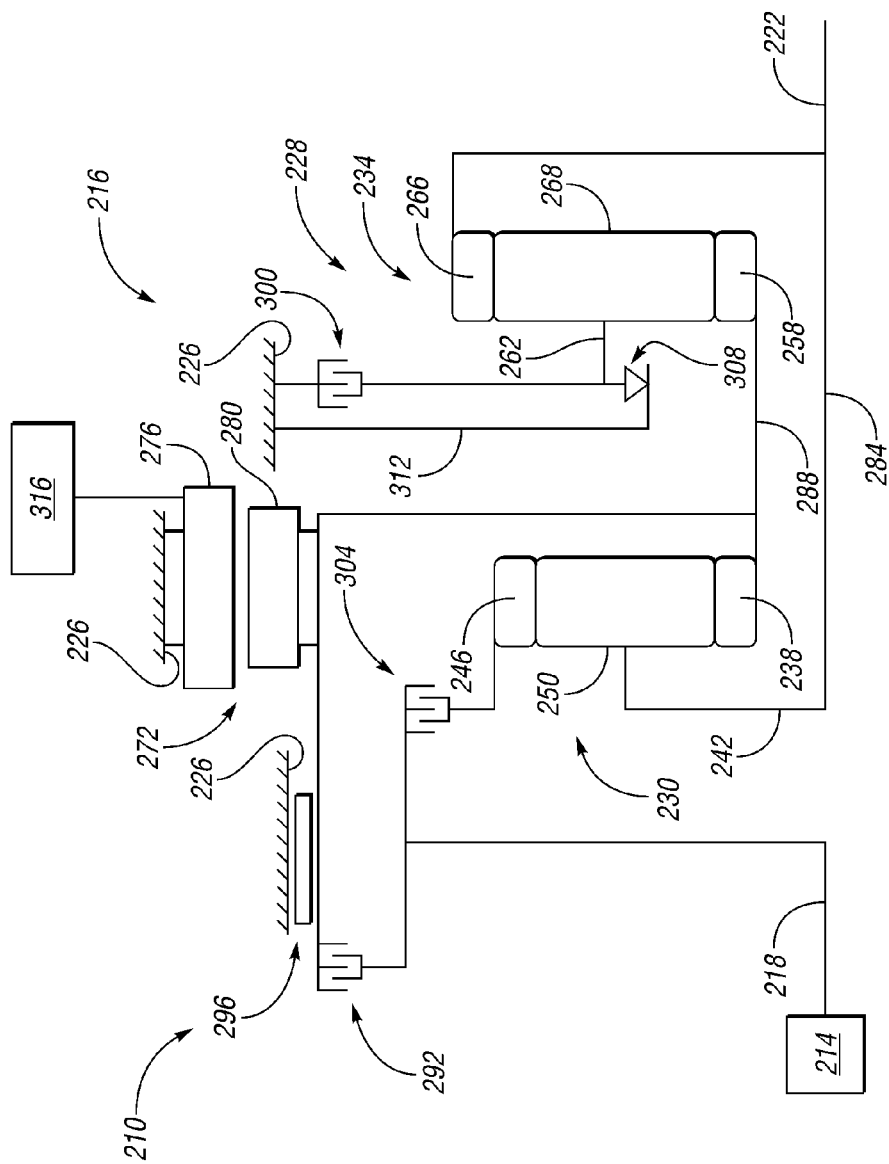
FIG. 2 is a schematic depiction of another powertrain including a second transmission in accordance with the claimed invention.

Referring to FIG. 2, a powertrain 210 includes an engine 214 operatively connected to a transmission 216. The transmission 216 includes an input member 218, an output member 222, and a stationary member, such as the transmission housing 226. The transmission 216 also includes a geartrain 228 having a first planetary gearset 230 and a second planetary gearset 234. The engine 214 is operatively connected to the input member 218 to transmit torque thereto.

The first planetary gearset 230 includes a first member, i.e. sun gear member 238, a second member, i.e., planet carrier 242, and a third member, i.e. ring gear member 246. A plurality of planet gears 250 are rotatably mounted to the planet carrier 242. Each of the planet gears 250 is meshingly engaged with the sun gear member 238 and the ring gear member 246.

The second planetary gearset 234 includes a first member, i.e. sun gear member 258, a second member, i.e., planet carrier 262, and a third member, i.e. ring gear member 266. A plurality of planet gears 268 are rotatably mounted to the planet carrier 262. Each of the planet gears 268 is meshingly engaged with the sun gear member 258 and the ring gear member 266.

The transmission 216 has a single motor/generator 272 having a stator 276 and a rotor 280. The stator 276 is mounted with respect to the housing 226. A shaft 284 interconnects the planet carrier 242 of the first planetary gearset 230, the ring gear member 266 of the second planetary gearset 234, and the output member 222 for unitary rotation, i.e., such that the planet carrier 242, the ring gear member 266, and the output member 222 rotate together as a unit. A member 288 interconnects the sun gear member 238 of the first planetary gearset 230, the sun gear member 258 of the second planetary gearset 234, and the rotor 280 for unitary rotation, i.e., such that the sun gear member 238, sun gear member 258, and the rotor 280 rotate together as a unit.

The transmission 216 further includes a plurality of torque transmitting devices 292, 296, 300, 304, each being selectively engageable to operatively interconnect a respective one of the members of the planetary gearsets 230, 234 to another of the members, the input member 218, the output member 222, or the stationary member 226. More specifically, a first torque transmitting device 292 is a clutch that is selectively engageable to operatively connect member 288, sun gear member 238, sun gear member 258, and rotor 280 to the input member 218 for unitary rotation. A second torque transmitting device 296 is a brake that is selectively engageable to operatively couple member 288, sun gear member 238, sun gear member 258, and rotor 280 to the housing 226. A third torque transmitting device 304 is a clutch that is selectively engageable to operatively couple ring gear member 246 and input member 218 for unitary rotation. A fourth torque transmitting device 300 is a brake that is selectively engageable to operatively couple planet carrier member 262 to the housing 226. A one-way clutch 308 operatively interconnects planet carrier 262 and the housing 226 via member 312. The one-way clutch 308 is configured to permit the rotation of the planet carrier 262 in one direction, and to prevent the rotation of the planet carrier 262 in the opposite direction. A battery 316 is operatively connected to the motor/generator 272 to transmit electrical energy thereto, and to receive electrical energy therefrom.

The torque transmitting devices 292, 296, 300, 304 are engageable in various combinations to provide a plurality of fixed speed ratio modes in which the value of the speed ratio between the input member 218 and the output member 222 is independent of the speed of the rotor 280. More specifically, a first fixed speed ratio between the input member 218 and the output member 222 is achieved when torque transmitting device 304 is engaged and torque transmitting devices 292, 296 and 300 are disengaged (torque transmitting device 300 may be engaged in the first fixed speed ratio during manual range coast braking) It should be noted that one way clutch 308 carries torque in the first fixed speed ratio. A second fixed speed ratio between the input member 218 and the output member 222 is achieved when torque transmitting devices 304 and 296 are engaged and torque transmitting devices 292, 300 are disengaged. A third fixed speed ratio between the input member 218 and the output member 222 is achieved when torque transmitting devices 292 and 304 are engaged and torque transmitting devices 296 and 300 are disengaged. A reverse speed ratio is achieved when torque transmitting devices 292, 300 are engaged and torque transmitting devices 296, 304 are disengaged.

The powertrain 210 may be operated as a hybrid powertrain during the fixed ratio modes of operation. More specifically, when the commanded power output of the powertrain 210 is less than the power output of the engine 214, the excess power of the engine 214 may be used to drive motor/generator 272, with the electrical energy being transmitted to the battery 316 for storage. Similarly, when the commanded power output of the powertrain 210 is higher than the power output of the engine 214, then electrical energy from the battery 316 is supplied to the motor/generator 272.

The torque transmitting devices 292, 296, 304, 300 are also engageable in at least one combination to provide an electrically variable mode of operation in which the speed ratio between the input member 218 and the output member 222 is dependent on the speed of the rotor 280. More specifically, in the embodiment depicted, the speed ratio between the input member 218 and the output member 222 is dependent upon, or varies with, the rotational velocity of the rotor 280 when torque transmitting device 304 is engaged and torque transmitting devices 292, 296, and 300 are disengaged. Accordingly, in the electrically variable mode of operation, the speed ratio is controllable by controlling the speed of the rotor 280.

The transmission 216 is characterized by the absence of any additional electric motors (besides motor/generator 272) that are configured to add power to the input member 218, output member 222, stationary member 226, or any member of the planetary gearsets 230, 234.

Figure 3:
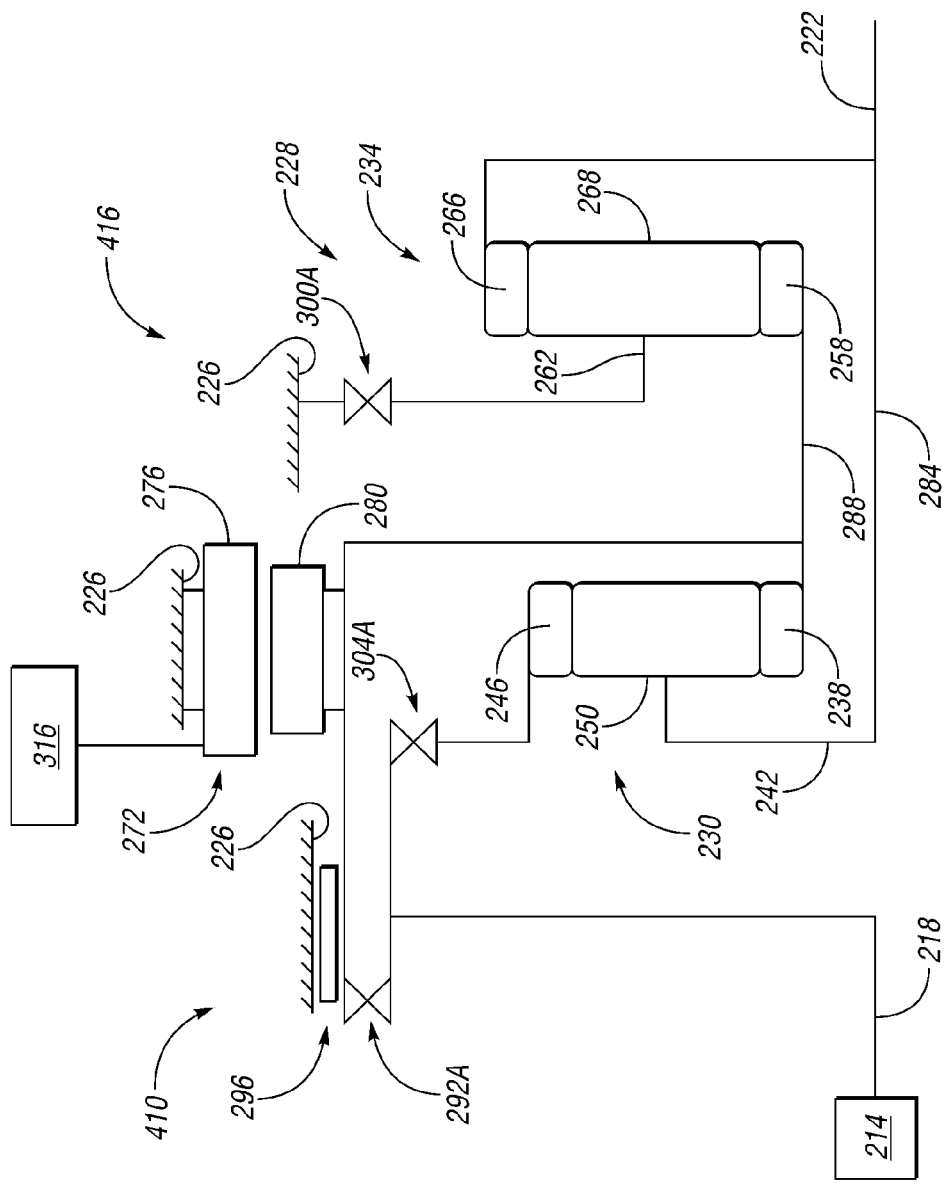
FIG. 3 is a schematic depiction of yet another powertrain including a third transmission in accordance with the claimed invention.

Referring to FIG. 3, wherein like reference numbers refer to like components from FIG. 2, a powertrain 410 is schematically depicted. The powertrain 410 of FIG. 3 is substantially identical to powertrain 210 of FIG. 2, except that the transmission 416 differs from the transmission 216 of FIG. 2. Transmission 416 is substantially identical to the transmission 216 of FIG. 2, except that (1) transmission 416 lacks a one-way clutch, such as the one shown at 308 in FIG. 2, to operatively interconnect planet carrier 262 to the housing 226; and (2) each of clutches 292, 300, 304 is replaced with a respective four-state selectable one-way clutches (SOWC) 292A, 300A, 304A.

Each of the SOWCs 292A, 300A, 304A operatively interconnects respective first and second members. More specifically, in transmission 416, SOWC 292A operatively interconnects a first member, i.e., input member 218, and a second member, i.e., the sun gear member 238; SOWC 304A operatively interconnects a first member, i.e., input member 218, and a second member, i.e., the ring gear member 246; SOWC 300A operatively interconnects a first member, i.e., the housing 226, and a second member, i.e., the planet carrier 262.

The four states of SOWCs 292A, 300A, 304A include first, second, third, and fourth states. In the first state, the SOWC permits rotation of the first member relative to the second member in first and second directions; in the second state, the SOWC prevents rotation of the first member relative to the second member in the first and second directions; in the third state, the SOWC permits rotation of the first member relative to the second member in the first direction, and prevents rotation of the first member relative to the second member in the second direction; and in the fourth state, the SOWC prevents rotation of the first member relative to the second member in the first direction, and permits rotation of the first member relative to the second member in the second direction.

In one embodiment, the four state SOWCs are electromagnetically controlled using two nonrotating DC coils for actuation. The four-state SOWCs provide reduced spin loss compared to other clutch types. The SOWCs also permit the operation of transmission 416 without a high pressure pump to engage clutches. The motor/generator 272 must synchronize element speeds to lock the four-state SOWCs.

Figure 4:
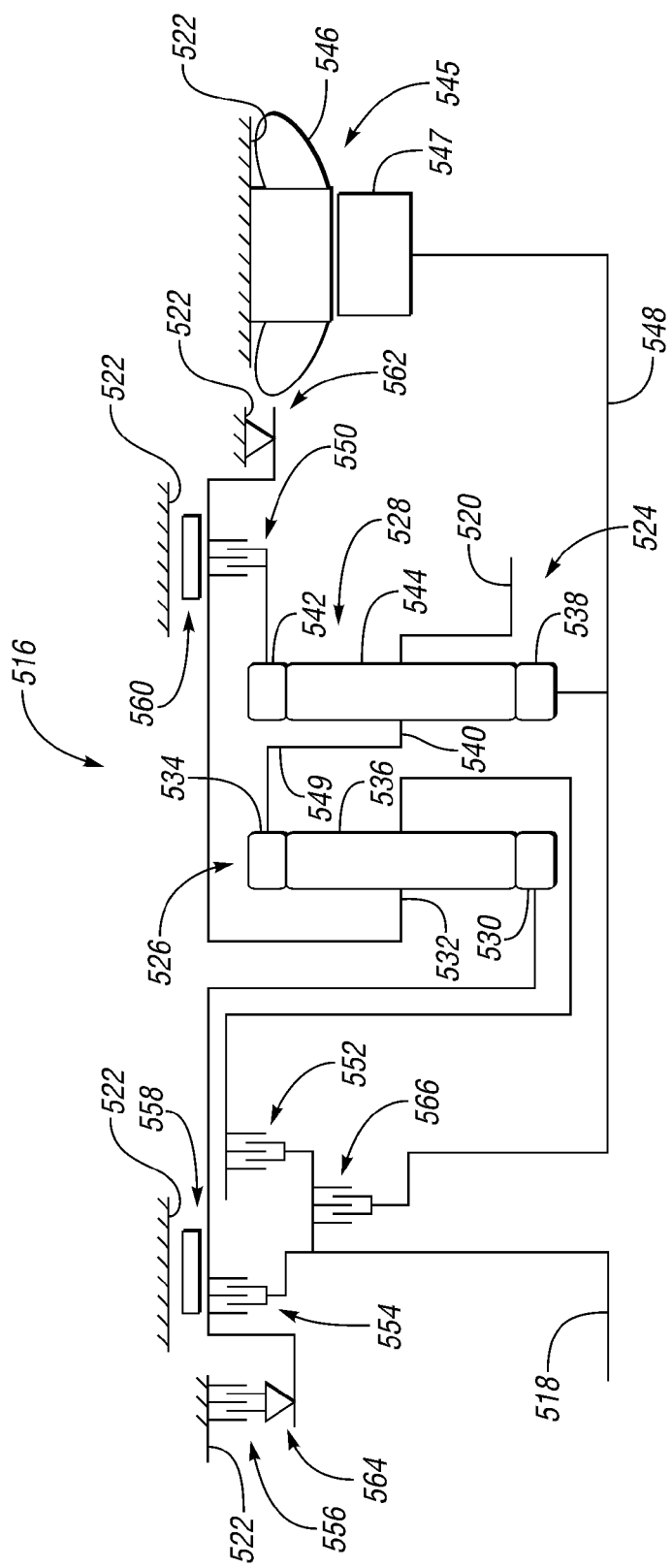
FIG. 4 is a schematic depiction of a fourth transmission in accordance with the claimed invention.

Referring to FIG. 4, a transmission 516 is schematically depicted. The transmission 516 includes an input member 518, an output member 520, and a stationary member, such as the transmission housing 522. The transmission 516 also includes a geartrain 524 having a first planetary gearset 526 and a second planetary gearset 528. The input member 518 is operatively connectable to an engine (such as the one shown at 14 in FIG. 1) to receive torque therefrom.

The first planetary gearset 526 includes a first member, i.e. sun gear member 530, a second member, i.e., planet carrier 532, and a third member, i.e. ring gear member 534. A plurality of planet gears 536 are rotatably mounted to the planet carrier 532. Each of the planet gears 536 is meshingly engaged with the sun gear member 530 and the ring gear member 534.

The second planetary gearset 528 includes a first member, i.e. sun gear member 538, a second member, i.e., planet carrier 540, and a third member, i.e. ring gear member 542. A plurality of planet gears 544 are rotatably mounted to the planet carrier 540. Each of the planet gears 544 is meshingly engaged with the sun gear member 538 and the ring gear member 542.

The transmission 516 has a single motor/generator 545 having a stator 546 and a rotor 547. The stator 546 is mounted with respect to the housing 522. A battery (not shown in FIG. 4), such as the one shown at 108 in FIG. 1, is operatively connected to the motor/generator 545 to transmit electrical energy thereto and to receive electrical energy therefrom.

A shaft 548 interconnects the sun gear member 538 of the second planetary gearset 528 and the rotor 547 for unitary rotation, i.e., such that the sun gear member 538 and the rotor 547 rotate together as a unit. A member 549 interconnects the ring gear member 534 of the first planetary gearset and the planet carrier 540 of the second planetary gearset 528 for unitary rotation, i.e., such that the ring gear member 534 and the planet carrier 540 rotate together as a unit.

The transmission 516 further includes a plurality of torque transmitting devices 550, 552, 554, 556, 558, 560, 566, each being selectively engageable to operatively interconnect a respective one of the members of the planetary gearsets 526, 528 to another of the members, the input member 518, the output member 520, or the stationary member 522. More specifically, a first torque transmitting device 550 is a clutch that is selectively engageable to operatively connect planet carrier 532 to ring gear member 542 for unitary rotation. A second torque transmitting device 552 is a clutch that is selectively engageable to operatively connect planet carrier 532 to the input member 518. A third torque transmitting device 554 is a clutch that is selectively engageable to operatively connect sun gear member 530 to the input member 518 for unitary rotation.

A fourth torque transmitting device 556 is a brake that is selectively engageable to operatively connect sun gear member 530 to the housing 522. A fifth torque transmitting device 558 is a brake that is selectively engageable to operatively connect sun gear member 530 to the housing 522. A sixth torque transmitting device 560 is a brake that is selectively engageable to operatively connect planet carrier 532 to the housing 522. A seventh torque transmitting device 566 is a clutch that is selectively engageable to operatively connect the input member 518 and sun gear member 538 for unitary rotation.

A one-way clutch 562 operatively interconnects planet carrier 532 and the housing 522. The one-way clutch 562 is configured to permit the rotation of the planet carrier 532 in one direction, and to prevent the rotation of the planet carrier 532 in the opposite direction. Another one-way clutch 564 operatively interconnects sun gear member 530 and torque transmitting device 556. Accordingly, when torque transmitting device 556 is engaged, one-way clutch 564 permits the rotation of the sun gear member 530 in one direction, and prevents the rotation of the sun gear member 530 in the opposite direction.

Table 1 depicts operating modes of the transmission 516, and the status of the torque transmitting devices 550-566 during each of the modes. As used in table, "X" indicates that a torque transmitting device is engaged and carrying torque; "O" indicates that a torque transmitting device is engaged but not carrying torque; "C" indicates that a torque transmitting device is engaged only during manual range coast braking; "S" indicates that a torque transmitting device is applied and slipping if needed to supplement torque from the motor/generator 545 or another function; and "P" indicates that the motor/generator 545 may be providing torque in a parallel hybrid mode (e.g., during the fixed speed ratios). The first column indicates the transmission mode; subsequent columns indicate torque transmitting device or motor/generator by reference number.

TABLE 1

|  | 550 | 552 | 554 | 556 | 558 | 560 | 562 | 564 | 566 | 545 |
|---|---|---|---|---|---|---|---|---|---|---|
| Reverse |  |  | X | O |  | X |  |  | X | P |
| Reverse Launch (engine on) |  |  | S |  |  | X |  |  |  | X |
| Neutral |  |  |  |  |  | O |  |  | O |  |
| EV1 | X |  |  |  |  | X |  |  |  | X |
| Engine Start | X |  |  |  |  | X |  |  | S | X |
| Forward Launch (engine on) | X |  |  |  |  | X |  |  | S | X |
| Electrically Variable 1$^{st}$ | X | X |  |  |  |  |  |  | S | X |
| 1$^{st}$ Fixed Speed Ratio | X |  |  |  |  |  |  | X | X | P |
| 2$^{nd}$ Fixed Speed Ratio | X |  |  | X | C |  |  | X | X | P |
| 3$^{rd}$ Fixed Speed Ratio | X | X |  |  | O |  |  |  | X | P |
| 4$^{th}$ Fixed Speed Ratio | O | X |  |  | X |  |  |  |  | P |
| EV2 | X |  |  |  | X |  |  |  |  | X |

Accordingly, the torque transmitting devices 550, 552, 554, 556, 558, 560, 566 are engageable in various combinations to provide at least four fixed speed ratio modes in which the value of the speed ratio between the input member 518 and the output member 520 is independent of the speed of rotor 547. The torque transmitting devices 550, 552, 554, 556, 558, 560, 566 are also engageable in various combinations to provide at least two battery-electric modes (EV1 and EV2) in which all of the power transmitted to the output member 520 is supplied by the battery via the motor/generator 545 and in which the engine is not mechanically connected to the output member 520.

The torque transmitting devices 550, 552, 554, 556, 558, 560, 566 are also engageable in at least one combination to provide an electrically variable mode of operation in which the speed ratio between the input member 518 and the output member 520 is dependent upon the speed of the rotor 547.

Figure 5:
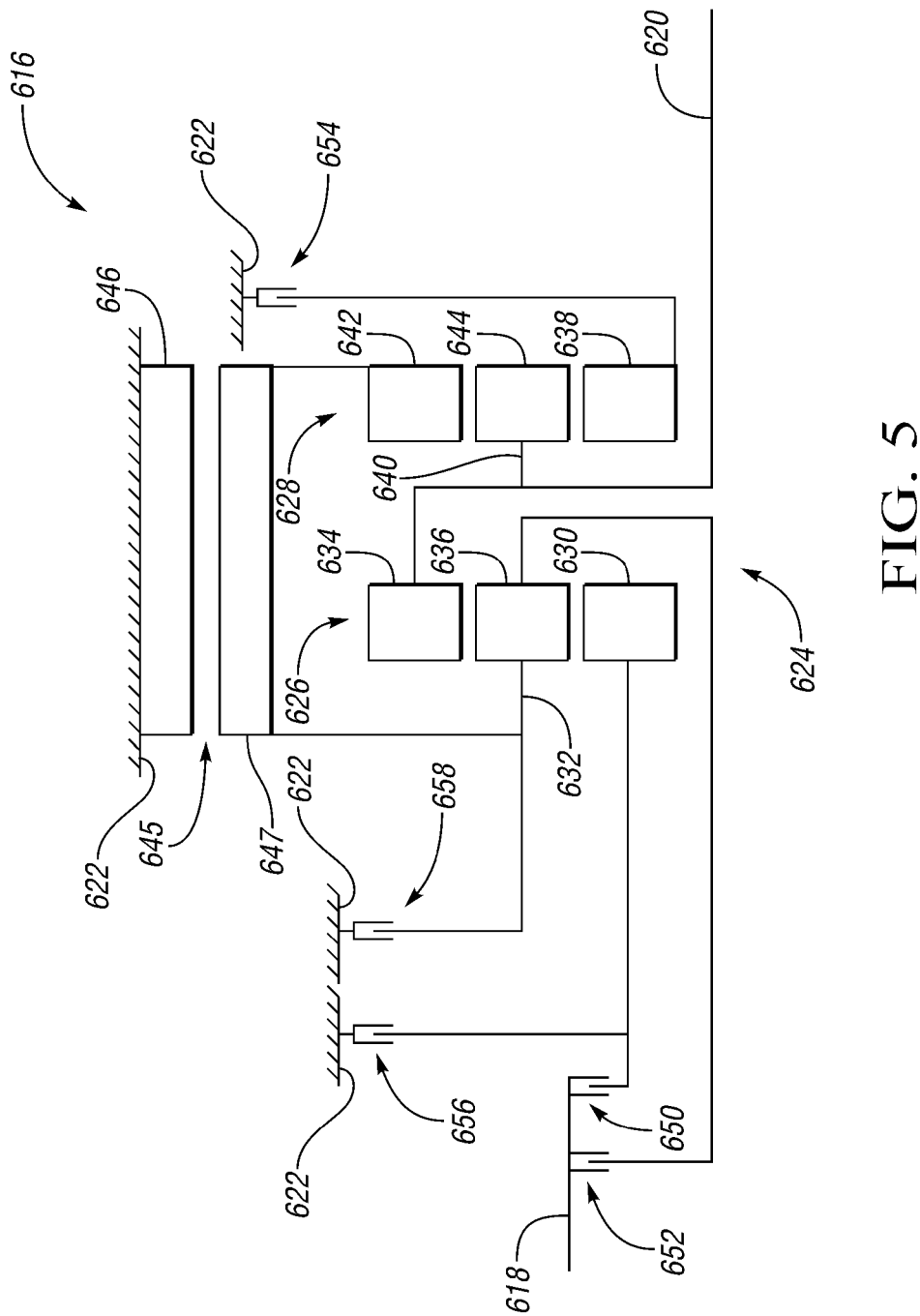
FIG. 5 is a schematic depiction of a fifth transmission in accordance with the claimed invention.

Referring to FIG. 5, a transmission 616 is schematically depicted. The transmission 616 includes an input member 618, an output member 620, and a stationary member, such as the transmission housing 622. The transmission 616 also includes a geartrain 624 having a first planetary gearset 626 and a second planetary gearset 628. The input member 618 is operatively connectable to an engine (such as the one shown at 14 in FIG. 1) to receive torque therefrom.

The first planetary gearset 626 includes a first member, i.e. sun gear member 630, a second member, i.e., planet carrier 632, and a third member, i.e. ring gear member 634. A plurality of planet gears 636 are rotatably mounted to the planet carrier 632. Each of the planet gears 636 is meshingly engaged with the sun gear member 630 and the ring gear member 634.

The second planetary gearset 628 includes a first member, i.e. sun gear member 638, a second member, i.e., planet carrier 640, and a third member, i.e. ring gear member 642. A plurality of planet gears 644 are rotatably mounted to the planet carrier 640. Each of the planet gears 644 is meshingly engaged with the sun gear member 638 and the ring gear member 642. The transmission 616 has a single motor/generator 645 having a stator 646 and a rotor 647. The stator 646 is mounted with respect to the housing 622. The rotor 647 is operatively connected to the planet carrier 632 and the ring gear member 642 for unitary rotation, i.e., such that the planet carrier 632, the ring gear member 642, and the rotor 647 rotate together as a unit. Ring gear member 634 and planet carrier 640 are operatively interconnected for unitary rotation.

The transmission 616 further includes a plurality of torque transmitting devices 650, 652, 654, 656, 658, each being selectively engageable to operatively interconnect a respective one of the members of the planetary gearsets 626, 628 to another of the members, the input member 618, the output member 620, or the stationary member 622. More specifically, a first torque transmitting device 650 is a clutch that is selectively engageable to operatively connect the input member 618 and sun gear member 630 for unitary rotation. A second torque transmitting device 652 is a clutch that is selectively engageable to operatively connect the input member 618 and planet carrier 632 for unitary rotation. A third torque transmitting device 654 is a brake that is selectively engageable to operatively connect sun gear member 638 to the housing 622. A fourth torque transmitting device 656 is a brake that is selectively engageable to operatively connect sun gear member 630 and the housing 622. A fifth torque transmitting device 658 is a brake that is selectively engageable to operatively connect planet carrier 632 and the housing 622.

The torque transmitting devices are engageable in various combinations to provide a plurality of fixed speed ratio modes in which the value of the speed ratio between the input member 618 and the output member 620 is independent of the speed of the rotor 647. More specifically, a first fixed speed ratio between the input member 618 and the output member 620 is achieved when torque transmitting devices 650 and 654 are engaged and torque transmitting devices 652, 656, and 658 are disengaged. A second fixed speed ratio between the input member 618 and the output member 620 is achieved when torque transmitting devices 652 and 654 are engaged and torque transmitting devices 650, 656, and 658 are disengaged. A third fixed speed ratio between the input member 618 and the output member 620 is achieved when torque transmitting devices 650 and 652 are engaged and torque transmitting devices 654, 656, and 658 are disengaged. A fourth fixed speed ratio between the input member 618 and the output member 620 is achieved when torque transmitting devices 652 and 656 are engaged and torque transmitting devices 650, 654, and 658 are disengaged.

The transmission 616 also includes a battery (not shown), such as the one shown at 108 in FIG. 1. The battery is operatively connected to the motor/generator 645 to transmit electrical energy thereto, and to receive electrical energy therefrom. Accordingly, the transmission 616 may be operated in a hybrid mode during the fixed ratio modes of operation. More specifically, when the commanded power output of the transmission 616 is less than the power output of the engine, the excess power of the engine may be used to drive motor/generator 645, with the electrical energy being transmitted to the battery for storage. Similarly, when the commanded power output of the transmission 616 is higher than the power output of the engine, then electrical energy from the battery is supplied to the motor/generator 645.

The torque transmitting devices 650, 652, 654, 656, 658 are also engageable in at least one combination to provide an electrically variable mode of operation in which the speed ratio between the input member 618 and the output member 620 is dependent on the speed of the rotor 647. More specifically, in the embodiment depicted, the speed ratio between the input member 618 and the output member 620 is dependent upon, or varies with, the rotational velocity of the rotor 647 when torque transmitting device 650 is engaged and torque transmitting devices 652, 654, 656, and 658 are disengaged. Accordingly, in the electrically variable mode of operation, the speed ratio is controllable by controlling the speed of the rotor 647.

The torque transmitting devices are also engageable in at least one combination to provide at least one battery-electric mode of operation. The transmission 616 is characterized by two battery-electric modes of operation. More specifically, a first battery-electric mode is achieved when torque transmitting device 654 is engaged and torque transmitting devices 650, 652, 656, and 658 are disengaged. A second battery-electric mode is achieved when torque transmitting device 656 is engaged and torque transmitting devices 650, 652, 654, and 658 are disengaged. A reverse mode of operation is achieved with torque transmitting devices 650, 658 being engaged and torque transmitting devices 652, 654, 656 being disengaged.

Figure 6:
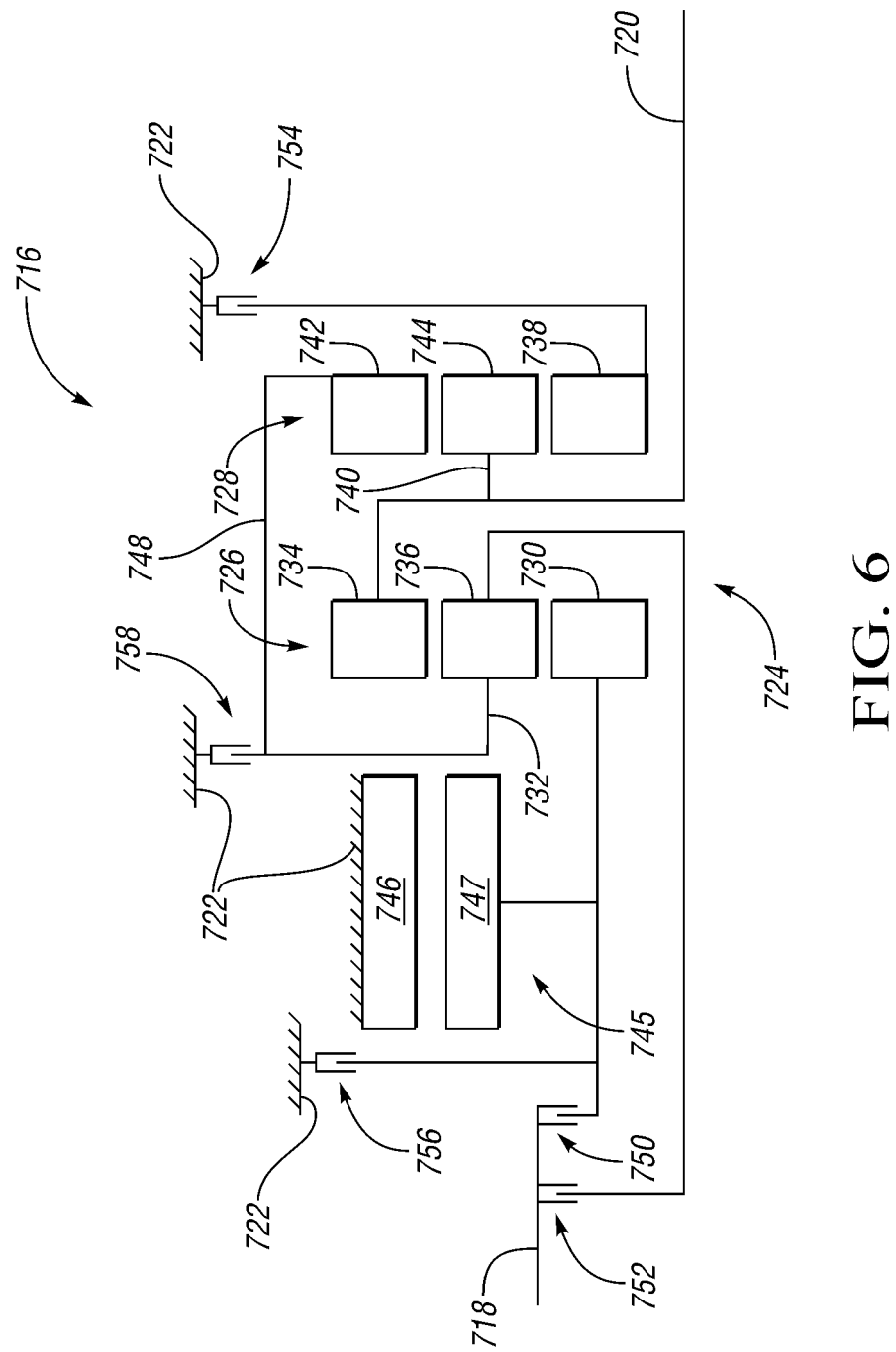
FIG. 6 is a schematic depiction of a sixth transmission in accordance with the claimed invention.

Referring to FIG. 6, a transmission 716 is schematically depicted. The transmission 716 includes an input member 718, an output member 720, and a stationary member, such as the transmission housing 722. The transmission 716 also includes a geartrain 724 having a first planetary gearset 726 and a second planetary gearset 728. The input member 718 is operatively connectable to an engine (such as the one shown at 14 in FIG. 1) to receive torque therefrom.

The first planetary gearset 726 includes a first member, i.e. sun gear member 730, a second member, i.e., planet carrier 732, and a third member, i.e. ring gear member 734. A plurality of planet gears 736 are rotatably mounted to the planet carrier 732. Each of the planet gears 736 is meshingly engaged with the sun gear member 730 and the ring gear member 734.

The second planetary gearset 728 includes a first member, i.e. sun gear member 738, a second member, i.e., planet carrier 740, and a third member, i.e. ring gear member 742. A plurality of planet gears 744 are rotatably mounted to the planet carrier 740. Each of the planet gears 744 is meshingly engaged with the sun gear member 738 and the ring gear member 742. The transmission 716 has a single motor/generator 745 having a stator 746 and a rotor 747. The stator 746 is mounted with respect to the housing 722. The rotor 747 is operatively connected to sun gear member 730 for unitary rotation, i.e., such that the sun gear member 730, and the rotor 747 rotate together as a unit. Ring gear member 734 and planet carrier 740 are operatively interconnected for unitary rotation. Planet carrier 732 and ring gear member 742 are operatively interconnected by member 748 for unitary rotation.

The transmission 716 further includes a plurality of torque transmitting devices 750, 752, 754, 756, 758, each being selectively engageable to operatively interconnect a respective one of the members of the planetary gearsets 726, 728 to another of the members, the input member 718, the output member 720, or the stationary member 722. More specifically, a first torque transmitting device 750 is a clutch that is selectively engageable to operatively connect the input member 718 and sun gear member 730 for unitary rotation. A second torque transmitting device 752 is a clutch that is selectively engageable to operatively connect the input member 718 and planet carrier 732 for unitary rotation. A third torque transmitting device 754 is a brake that is selectively engageable to operatively connect sun gear member 738 to the housing 722. A fourth torque transmitting device 756 is a brake that is selectively engageable to operatively connect sun gear member 730 and the housing 722. A fifth torque transmitting device 758 is a brake that is selectively engageable to operatively connect planet carrier 732 and the housing 722.

The torque transmitting devices are engageable in various combinations to provide a plurality of fixed speed ratio modes in which the value of the speed ratio between the input member 718 and the output member 722 is independent of the speed of the rotor 747. More specifically, a first fixed speed ratio between the input member 718 and the output member 720 is achieved when torque transmitting devices 750 and 754 are engaged and torque transmitting devices 752, 756, and 758 are disengaged. A second fixed speed ratio between the input member 718 and the output member 720 is achieved when torque transmitting devices 752 and 754 are engaged and torque transmitting devices 750, 756, and 758 are disengaged. A third fixed speed ratio between the input member 718 and the output member 720 is achieved when torque transmitting devices 750 and 752 are engaged and torque transmitting devices 754, 756, and 758 are disengaged. A fourth fixed speed ratio between the input member 718 and the output member 720 is achieved when torque transmitting devices 752 and 756 are engaged and torque transmitting devices 750, 754, and 758 are disengaged The transmission 716 also includes a battery (not shown), such as the one shown at 108 in FIG. 1. The battery is operatively connected to the motor/generator 745 to transmit electrical energy thereto, and to receive electrical energy therefrom. Accordingly, the transmission 716 may be operated in a hybrid mode during the fixed ratio modes of operation.

The torque transmitting devices 750, 752, 754, 756, 758 are also engageable in at least one combination to provide an electrically variable mode of operation in which the speed ratio between the input member 718 and the output member 720 is dependent on the speed of the rotor 747. More specifically, in the embodiment depicted, the speed ratio between the input member 718 and the output member 720 is dependent upon, or varies with, the rotational velocity of the rotor 747 when torque transmitting device 752 is engaged and torque transmitting devices 750, 754, 756, and 758 are disengaged. Accordingly, in the electrically variable mode of operation, the speed ratio is controllable by controlling the speed of the rotor 747.

The torque transmitting devices are also engageable in at least one combination to provide at least one battery-electric mode of operation. The transmission 716 is characterized by two battery-electric modes of operation. More specifically, a first battery-electric mode is achieved when torque transmitting device 754 is engaged and torque transmitting devices 750, 752, 756, and 758 are disengaged. A second battery-electric mode is achieved when torque transmitting device 758 is engaged and torque transmitting devices 750, 752, 754, and 756 are disengaged. The second battery-electric mode is a reverse mode. A reverse mode of operation (between the input member 718 and the output member 720) is achieved with torque transmitting devices 750, 758 being engaged and torque transmitting devices 752, 754, 756 being disengaged.

Figure 7:
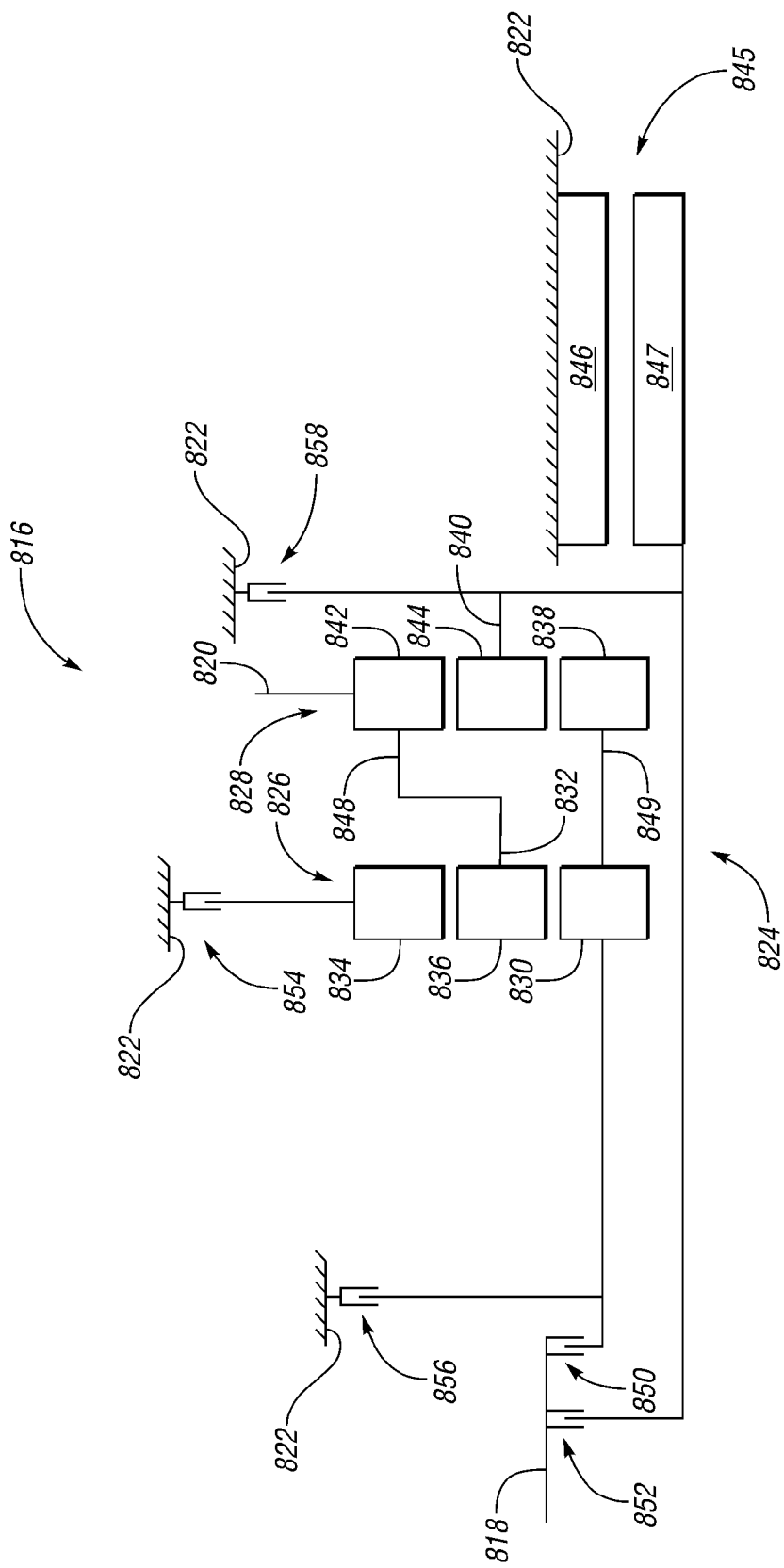
FIG. 7 is a schematic depiction of a seventh transmission in accordance with the claimed invention.

Referring to FIG. 7, a transmission 816 is schematically depicted. The transmission 816 includes an input member 818, an output member 820, and a stationary member, such as the transmission housing 822. The transmission 816 also includes a geartrain 824 having a first planetary gearset 826 and a second planetary gearset 828. The input member 818 is operatively connectable to an engine (such as the one shown at 14 in FIG. 1) to receive torque therefrom.

The first planetary gearset 826 includes a first member, i.e. sun gear member 830, a second member, i.e., planet carrier 832, and a third member, i.e. ring gear member 834. A plurality of planet gears 836 are rotatably mounted to the planet carrier 832. Each of the planet gears 836 is meshingly engaged with the sun gear member 830 and the ring gear member 834.

The second planetary gearset 828 includes a first member, i.e. sun gear member 838, a second member, i.e., planet carrier 840, and a third member, i.e. ring gear member 842. A plurality of planet gears 844 are rotatably mounted to the planet carrier 840. Each of the planet gears 844 is meshingly engaged with the sun gear member 838 and the ring gear member 842. The transmission 816 has a single motor/generator 845 having a stator 846 and a rotor 847. The stator 846 is mounted with respect to the housing 822. The rotor 847 is operatively connected to planet carrier 840 for unitary rotation, i.e., such that the planet carrier 840, and the rotor 847 rotate together as a unit. Ring gear member 842 and planet carrier 832 are operatively interconnected for unitary rotation by interconnecting member 848. Sun gear member 830 and sun gear member 838 are operatively interconnected by member 849 for unitary rotation.

The transmission 816 further includes a plurality of torque transmitting devices 850, 852, 854, 856, 858, each being selectively engageable to operatively interconnect a respective one of the members of the planetary gearsets 826, 828 to another of the members, the input member 818, the output member 820, or the stationary member 822. More specifically, a first torque transmitting device 850 is a clutch that is selectively engageable to operatively connect the input member 818 to sun gear member 830 and sun gear member 838 for unitary rotation. A second torque transmitting device 852 is a clutch that is selectively engageable to operatively connect the input member 818 to planet carrier 840 and rotor 847 for unitary rotation. A third torque transmitting device 854 is a brake that is selectively engageable to operatively connect ring gear member 834 to the housing 822. A fourth torque transmitting device 856 is a brake that is selectively engageable to operatively connect sun gear member 830 and sun gear member 838 to the housing 822. A fifth torque transmitting device 858 is a brake that is selectively engageable to operatively connect planet carrier 840 and rotor 847 to the housing 822.

The torque transmitting devices are engageable in various combinations to provide a plurality of fixed speed ratio modes in which the value of the speed ratio between the input member 818 and the output member 822 is independent of the speed of the rotor 847. More specifically, a first fixed speed ratio between the input member 818 and the output member 820 is achieved when torque transmitting devices 850 and 854 are engaged and torque transmitting devices 852, 856, and 858 are disengaged. A second fixed speed ratio between the input member 818 and the output member 820 is achieved when torque transmitting devices 852 and 854 are engaged and torque transmitting devices 850, 856, and 858 are disengaged. A third fixed speed ratio between the input member 818 and the output member 820 is achieved when torque transmitting devices 850 and 852 are engaged and torque transmitting devices 854, 856, and 858 are disengaged. A fourth fixed speed ratio between the input member 818 and the output member 820 is achieved when torque transmitting devices 852 and 856 are engaged and torque transmitting devices 850, 854, and 858 are disengaged.

The transmission 816 also includes a battery (not shown), such as the one shown at 108 in FIG. 1. The battery is operatively connected to the motor/generator 845 to transmit electrical energy thereto, and to receive electrical energy therefrom. Accordingly, the transmission 816 may be operated in a hybrid mode during the fixed ratio modes of operation.

The torque transmitting devices 850, 852, 854, 856, 858 are also engageable in at least one combination to provide an electrically variable mode of operation in which the speed ratio between the input member 818 and the output member 820 is dependent on the speed of the rotor 847. More specifically, in the embodiment depicted, the speed ratio between the input member 818 and the output member 820 is dependent upon, or varies with, the rotational velocity of the rotor 847 when torque transmitting device 850 is engaged and torque transmitting devices 852, 854, 856, and 858 are disengaged. Accordingly, in the electrically variable mode of operation, the speed ratio is controllable by controlling the speed of the rotor 847.

The torque transmitting devices are also engageable in at least one combination to provide at least one battery-electric mode of operation. The transmission 816 is characterized by two battery-electric modes of operation. More specifically, a first battery-electric mode is achieved when torque transmitting device 854 is engaged and torque transmitting devices 850, 852, 856, and 858 are disengaged. A second battery-electric mode is achieved when torque transmitting device 856 is engaged and torque transmitting devices 850, 852, 854, and 858 are disengaged. A reverse mode of operation (between the input member 818 and the output member 820) is achieved with torque transmitting devices 850, 858 being engaged and torque transmitting devices 852, 854, 856 being disengaged.

Figure 8:
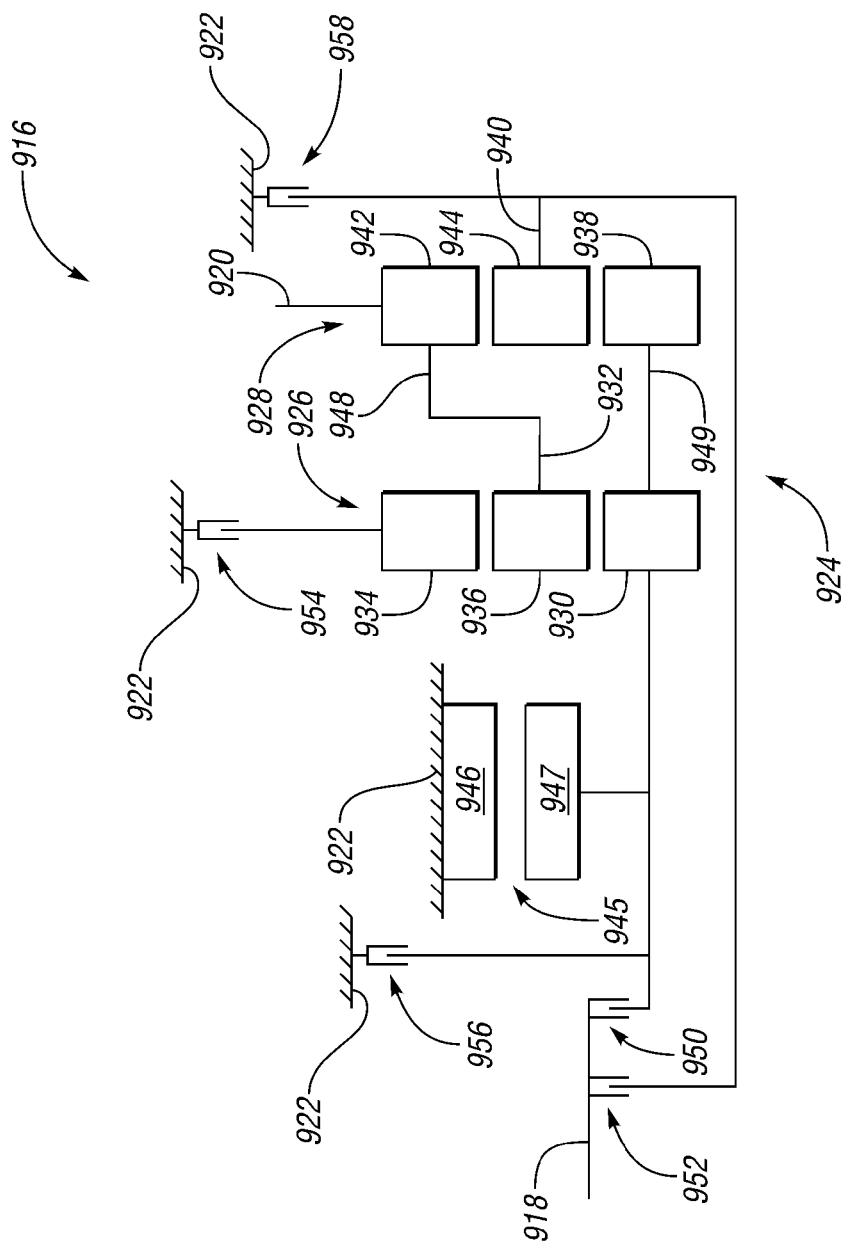
FIG. 8 is a schematic depiction of an eighth transmission in accordance with the claimed invention.

Referring to FIG. 8, a transmission 916 is schematically depicted. The transmission 916 includes an input member 918, an output member 920, and a stationary member, such as the transmission housing 922. The transmission 916 also includes a geartrain 924 having a first planetary gearset 926 and a second planetary gearset 928. The input member 918 is operatively connectable to an engine (such as the one shown at 14 in FIG. 1) to receive torque therefrom.

The first planetary gearset 926 includes a first member, i.e. sun gear member 930, a second member, i.e., planet carrier 932, and a third member, i.e. ring gear member 934. A plurality of planet gears 936 are rotatably mounted to the planet carrier 932. Each of the planet gears 936 is meshingly engaged with the sun gear member 930 and the ring gear member 934.

The second planetary gearset 928 includes a first member, i.e. sun gear member 938, a second member, i.e., planet carrier 940, and a third member, i.e. ring gear member 942. A plurality of planet gears 944 are rotatably mounted to the planet carrier 940. Each of the planet gears 944 is meshingly engaged with the sun gear member 938 and the ring gear member 942. The transmission 916 has a single motor/generator 945 having a stator 946 and a rotor 947. The stator 946 is mounted with respect to the housing 922. The rotor 947 is operatively connected to sun gear member 930 for unitary rotation, i.e., such that the sun gear member 930, and the rotor 947 rotate together as a unit. Ring gear member 942 and planet carrier 932 are operatively interconnected for unitary rotation by interconnecting member 948. Sun gear member 930 and sun gear member 938 are operatively interconnected by member 949 for unitary rotation.

The transmission 916 further includes a plurality of torque transmitting devices 950, 952, 954, 956, 958, each being selectively engageable to operatively interconnect a respective one of the members of the planetary gearsets 926, 928 to another of the members, the input member 918, the output member 920, or the stationary member 922. More specifically, a first torque transmitting device 950 is a clutch that is selectively engageable to operatively connect the input member 918 to sun gear member 930, sun gear member 938, and rotor 947 for unitary rotation. A second torque transmitting device 952 is a clutch that is selectively engageable to operatively connect the input member 918 to planet carrier 940 for unitary rotation. A third torque transmitting device 954 is a brake that is selectively engageable to operatively connect ring gear member 934 to the housing 922. A fourth torque transmitting device 956 is a brake that is selectively engageable to operatively connect sun gear member 930, sun gear member 938, and rotor 947 to the housing 922. A fifth torque transmitting device 958 is a brake that is selectively engageable to operatively connect planet carrier 940 to the housing 922.

The torque transmitting devices are engageable in various combinations to provide a plurality of fixed speed ratio modes in which the value of the speed ratio between the input member 918 and the output member 920 is independent of the speed of the rotor 947. More specifically, a first fixed speed ratio between the input member 918 and the output member 920 is achieved when torque transmitting devices 950 and 954 are engaged and torque transmitting devices 952, 956, and 958 are disengaged. A second fixed speed ratio between the input member 918 and the output member 920 is achieved when torque transmitting devices 952 and 954 are engaged and torque transmitting devices 950, 956, and 958 are disengaged. A third fixed speed ratio between the input member 918 and the output member 920 is achieved when torque transmitting devices 950 and 952 are engaged and torque transmitting devices 954, 956, and 958 are disengaged. A fourth fixed speed ratio between the input member 918 and the output member 920 is achieved when torque transmitting devices 952 and 956 are engaged and torque transmitting devices 950, 954, and 958 are disengaged.

The transmission 916 also includes a battery (not shown), such as the one shown at 108 in FIG. 1. The battery is operatively connected to the motor/generator 945 to transmit electrical energy thereto, and to receive electrical energy therefrom. Accordingly, the transmission 916 may be operated in a hybrid mode during the fixed ratio modes of operation.

The torque transmitting devices 950, 952, 954, 956, 958 are also engageable in at least one combination to provide an electrically variable mode of operation in which the speed ratio between the input member 918 and the output member 920 is dependent on the speed of the rotor 947. More specifically, in the embodiment depicted, the speed ratio between the input member 918 and the output member 920 is dependent upon, or varies with, the rotational velocity of the rotor 947 when torque transmitting device 952 is engaged and torque transmitting devices 950, 954, 956, and 958 are disengaged. Accordingly, in the electrically variable mode of operation, the speed ratio is controllable by controlling the speed of the rotor 947.

The torque transmitting devices are also engageable in at least one combination to provide at least one battery-electric mode of operation. The transmission 916 is characterized by two battery-electric modes of operation. More specifically, a first battery-electric mode is achieved when torque transmitting device 954 is engaged and torque transmitting devices 950, 952, 956, and 958 are disengaged. A second (reverse) battery-electric mode is achieved when torque transmitting device 958 is engaged and torque transmitting devices 950, 952, 954, and 956 are disengaged. A reverse mode of operation (between the input member 918 and the output member 920) is achieved with torque transmitting devices 950, 958 being engaged and torque transmitting devices 952, 954, 956 being disengaged.

The transmissions 516, 616, 716, 816, 916 are characterized by the absence of any additional electric motors (besides motor/generators 545, 645, 745, 845, 945, respectively) that are configured to add power to their respective input members, output members, stationary members, or any member of their planetary gearsets.

It should be noted that, as used in the claims, first, second, and third members of planetary gearsets may refer to any one of a ring gear member, sun gear member, and planet carrier. Thus, for example, a "first member" may be a sun gear, a ring gear, or a planet carrier within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member; an output member; a stationary member;
first and second planetary gearsets, each of said first and second gearsets having respective first, second, and third members;
a single motor/generator having a rotor that is operatively connected to one of the members of the planetary gearsets for rotation therewith; and
a plurality of torque transmitting devices, each of said torque transmitting devices being selectively engageable to operatively interconnect a respective one of the members of the first or second planetary gearsets to another of the members of the first or second planetary gearsets, the input member, the output member, or the stationary member;
wherein the torque transmitting devices are engageable in various combinations to provide a plurality of fixed speed ratio modes in which the value of the speed ratio between the input member and the output member is independent of the speed of the rotor; and
wherein the torque transmitting devices are engageable in at least one combination to provide an electrically variable mode of operation in which the speed ratio between the input member and the output member is dependent on the speed of the rotor;
wherein the first member of the first planetary gearset is operatively connected to the first member of the second planetary gearset for unitary rotation;
wherein the second member of the first planetary gearset is operatively connected to the third member of the second planetary gearset and the output member for unitary rotation;
wherein the rotor is operatively connected to the first member of the first planetary gearset and the first member of the second planetary gearset for unitary rotation;
wherein the plurality of torque transmitting devices includes first, second, third, and fourth torque transmitting devices;
wherein the first torque transmitting device is configured to selectively couple the input member to the third member of the first planetary gearset for unitary rotation;
wherein the second torque transmitting device is configured to selectively couple the first member of the first planetary gearset, the first member of the second planetary gearset, and the rotor to the stationary member;
wherein the third torque transmitting device is configured to selectively couple the first member of the first planetary gearset, the first member of the second planetary gearset, and the rotor to the second member of the second planetary gearset for unitary rotation; and
wherein the fourth torque transmitting device is configured to selectively couple the second member of the second planetary gearset to the stationary member.

2. The transmission of claim 1, wherein the torque transmitting devices are engageable in at least one combination to provide a mode of operation in which the input member is not mechanically connected to the output member, and the rotor is mechanically connected to the output member.

3. A transmission comprising:
an input member; an output member; a stationary member;
first and second planetary gearsets, each of said first and second gearsets having respective first, second, and third members;
a single motor/generator having a rotor that is operatively connected to one of the members of the planetary gearsets for rotation therewith; and
a plurality of torque transmitting devices, each of said torque transmitting devices being selectively engageable to operatively interconnect a respective one of the members of the first or second planetary gearsets to another of the members of the first or second planetary gearsets, the input member, the output member, or the stationary member; and
a one-way clutch operatively interconnecting the second member of the second planetary gearset to the stationary member;
wherein the torque transmitting devices are engageable in various combinations to provide a plurality of fixed speed ratio modes in which the value of the speed ratio between the input member and the output member is independent of the speed of the rotor; and
wherein the torque transmitting devices are engageable in at least one combination to provide an electrically variable mode of operation in which the speed ratio between the input member and the output member is dependent on the speed of the rotor;
wherein the first member of the first planetary gearset is operatively connected to the first member of the second planetary gearset for unitary rotation;
wherein the second member of the first planetary gearset is operatively connected to the third member of the second planetary gearset and the output member for unitary rotation
wherein the rotor is operatively connected to the first member of the first planetary gearset and the first member of the second planetary gearset for unitary rotation;
wherein the plurality of torque transmitting devices includes first, second, third, and fourth torque transmitting devices;
wherein the first torque transmitting device is configured to selectively couple the input member to the first member of the first planetary gearset, the first member of the second planetary gearset, and the rotor for unitary rotation;
wherein the second torque transmitting device is configured to selectively couple the first member of the first planetary gearset, the first member of the second planetary gearset, and the rotor to the stationary member;
wherein the third torque transmitting device is configured to selectively couple the input member to the third member of the first planetary gearset for unitary rotation; and
wherein the fourth torque transmitting device is configured to selectively couple the second member of the second planetary gearset to the stationary member.

4. A transmission comprising:
an input member; an output member; a stationary member;
first and second planetary gearsets, each of said first and second gearsets having respective first, second, and third members;
a single motor/generator having a rotor that is operatively connected to one of the members of the planetary gearsets for rotation therewith; and
a plurality of torque transmitting devices, each of said torque transmitting devices being selectively engageable to operatively interconnect a respective one of the members of the first or second planetary gearsets to another of the members of the first or second planetary gearsets, the input member, the output member, or the stationary member;
wherein the torque transmitting devices are engageable in various combinations to provide a plurality of fixed speed ratio modes in which the value of the speed ratio between the input member and the output member is independent of the speed of the rotor; and wherein the torque transmitting devices are engageable in at least one combination to provide an electrically variable mode of operation in which the speed ratio between the input member and the output member is dependent on the speed of the rotor;

wherein the first member of the first planetary gearset is operatively connected to the first member of the second planetary gearset for unitary rotation;

wherein the second member of the first planetary gearset is operatively connected to the third member of the second planetary gearset and the output member for unitary rotation;

wherein the rotor is operatively connected to the first member of the first planetary gearset and the first member of the second planetary gearset for unitary rotation;

wherein the plurality of torque transmitting devices includes first, second, third, and fourth torque transmitting devices;

wherein the first torque transmitting device is a four-state selectable one-way clutch that operatively interconnects the input member and the first member of the first planetary gearset, the first member of the second planetary gearset, and the rotor;

wherein the second torque transmitting device is configured to selectively couple the first member of the first planetary gearset, the first member of the second planetary gearset, and the rotor to the stationary member;

wherein the third torque transmitting device is a four-state selectable one-way clutch that operatively interconnects the input member and the third member of the first planetary gearset; and wherein the fourth torque transmitting device is a four-state selectable one-way clutch that operatively interconnects the stationary member and the second member of the second planetary gearset.

5. A transmission comprising:

an input member; an output member; a stationary member;

first and second planetary gearsets, each of said first and second gearsets having respective first, second, and third members;

a single motor/generator having a rotor that is operatively connected to one of the members of the planetary gearsets for rotation therewith; and a plurality of torque transmitting devices, each of said torque transmitting devices being selectively engageable to operatively interconnect a respective one of the members of the first or second planetary gearsets to another of the members of the first or second planetary gearsets, the input member, the output member, or the stationary member;

wherein the torque transmitting devices are engageable in various combinations to provide a plurality of fixed speed ratio modes in which the value of the speed ratio between the input member and the output member is independent of the speed of the rotor; and wherein the torque transmitting devices are engageable in at least one combination to provide an electrically variable mode of operation in which the speed ratio between the input member and the output member is dependent on the speed of the rotor;

wherein the first member of the first planetary gearset is operatively connected to the first member of the second planetary gearset for unitary rotation;

wherein the second member of the first planetary gearset is operatively connected to the third member of the second planetary gearset and the output member for unitary rotation wherein the plurality of torque transmitting devices includes first, second, third, fourth, and fifth torque transmitting devices;

wherein the first torque transmitting device is configured to selectively couple the input member to the first member of the first planetary gearset and the first member of the second planetary gearset for unitary rotation;

wherein the second torque transmitting device is configured to selectively couple the input member to the second member of the second planetary gearset for unitary rotation;

wherein the third torque transmitting device is configured to selectively couple the third member of the first planetary gearset to the stationary member;

wherein the fourth torque transmitting device is configured to selectively couple the first member of the first planetary gearset and the first member of the second planetary gearset to the stationary member; and wherein the fifth torque transmitting device is configured to selectively couple the second member of the second planetary gearset to the stationary member.

6. The transmission of claim 5, wherein the rotor is operatively connected to the second member of the second planetary gearset for unitary rotation therewith.

7. The transmission of claim 5, wherein the rotor is operatively connected to the first member of the first planetary gearset and the first member of the second planetary gearset for unitary rotation.

8. A transmission comprising:

an input member; an output member; a stationary member;

first and second planetary gearsets, each of said first and second gearsets having respective first, second, and third members;

a single motor/generator having a rotor that is operatively connected to one of the members of the planetary gearsets for rotation therewith; and a plurality of torque transmitting devices, each of said torque transmitting devices being selectively engageable to operatively interconnect a respective one of the members of the first or second planetary gearsets to another of the members of the first or second planetary gearsets, the input member, the output member, or the stationary member;

wherein the torque transmitting devices are engageable in various combinations to provide a plurality of fixed speed ratio modes in which the value of the speed ratio between the input member and the output member is independent of the speed of the rotor; and wherein the torque transmitting devices are engageable in at least one combination to provide an electrically variable mode of operation in which the speed ratio between the input member and the output member is dependent on the speed of the rotor;

wherein the second member of the first planetary gearset is operatively connected to the third member of the second planetary gearset for unitary rotation;

wherein the third member of the first planetary gearset is operatively connected to the second member of the second planetary gearset and the output member for unitary rotation;

wherein the plurality of torque transmitting devices includes first, second, third, fourth, and fifth torque transmitting devices;

wherein the first torque transmitting device is configured to selectively couple the input member to the first member of the first planetary gearset for unitary rotation;

wherein the second torque transmitting device is configured to selectively couple the input member to the second member of the first planetary gearset and the third member of the second planetary gearset for unitary rotation;

wherein the third torque transmitting device is configured to selectively couple the first member of the second planetary gearset to the stationary member;

wherein the fourth torque transmitting device is configured to selectively couple the first member of the first planetary gearset to the stationary member; and wherein the fifth torque transmitting device is configured to selectively couple the second member of the first planetary gearset and the third member of the second planetary gearset to the stationary member.

9. The transmission of claim 8, wherein the rotor is operatively connected to the second member of the first planetary gearset and the third member of the second planetary gearset for unitary rotation.

10. The transmission of claim 8, wherein the rotor is operatively connected to the first member of the first planetary gearset for unitary rotation.

11. A transmission comprising:

an input member; an output member; a stationary member;

first and second planetary gearsets, each of said first and second gearsets having respective first, second, and third members;

a single motor/generator having a rotor that is operatively connected to one of the members of the planetary gearsets for rotation therewith; and a plurality of torque transmitting devices, each of said torque transmitting devices being selectively engageable to operatively interconnect a respective one of the members of the first or second planetary gearsets to another of the members of the first or second planetary gearsets, the input member, the output member, or the stationary member;

wherein the torque transmitting devices are engageable in various combinations to provide a plurality of fixed speed ratio modes in which the value of the speed ratio between the input member and the output member is independent of the speed of the rotor; and wherein the torque transmitting devices are engageable in at least one combination to provide an electrically variable mode of operation in which the speed ratio between the input member and the output member is dependent on the speed of the rotor;

wherein the third member of the first planetary gearset is operatively connected to the second member of the second planetary gearset and the output member for unitary rotation;

wherein the rotor is operatively connected to the first member of the second planetary gearset for unitary rotation;

wherein the plurality of torque transmitting devices includes first, second, third, fourth, fifth, sixth, and seventh torque transmitting devices;

wherein the first torque transmitting device is configured to selectively couple the third member of the second planetary gearset to the second member of the first planetary gearset;

wherein the second torque transmitting device is configured to selectively couple the input member to the second member of the first planetary gearset;

wherein the third torque transmitting device is configured to selectively couple the input member to the first member of the first planetary gearset;

wherein the fourth torque transmitting device is configured to selectively couple the first member of the first planetary gearset to the stationary member;

wherein the fifth torque transmitting device is configured to selectively couple the first member of the first planetary gearset to the stationary member;

wherein the sixth torque transmitting device is configured to selectively couple the second member of the first planetary gearset to the stationary member;

wherein the seventh torque transmitting device is configured to selectively couple the first member of the second planetary gearset and the rotor to the input member; and wherein the transmission further includes a first one-way clutch that operatively interconnects the second member of the first planetary gearset and the stationary member, and a second one-way clutch that operatively interconnects the first member of the first planetary gearset and the fourth torque transmitting device.

* * * * *